(12) United States Patent
Zhang et al.

(10) Patent No.: US 11,328,670 B2
(45) Date of Patent: May 10, 2022

(54) PIXEL CIRCUIT, DRIVING METHOD THEREOF, AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Hao Zhang, Beijing (CN); Kuo Sun, Beijing (CN); Haijun Yin, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 640 days.

(21) Appl. No.: 16/316,834

(22) PCT Filed: Jun. 5, 2018

(86) PCT No.: PCT/CN2018/089967
§ 371 (c)(1),
(2) Date: Jan. 10, 2019

(87) PCT Pub. No.: WO2019/091105
PCT Pub. Date: May 16, 2019

(65) Prior Publication Data
US 2021/0335249 A1 Oct. 28, 2021

(30) Foreign Application Priority Data
Nov. 13, 2017 (CN) .......................... 201711116593.8

(51) Int. Cl.
*G09G 3/3258* (2016.01)
*G09G 3/3291* (2016.01)

(52) U.S. Cl.
CPC ......... *G09G 3/3258* (2013.01); *G09G 3/3291* (2013.01); *G09G 2300/0426* (2013.01);
(Continued)

(58) Field of Classification Search
CPC ............... G09G 3/3258; G09G 3/3291; G09G 2300/0426; G09G 2300/0842;
(Continued)

(56) References Cited

U.S. PATENT DOCUMENTS

2004/0217426 A1* 11/2004 Lee .................... H01L 27/14609
257/369
2007/0046593 A1* 3/2007 Shin ...................... G09G 3/3233
345/81
(Continued)

FOREIGN PATENT DOCUMENTS

CN 103309507 A 9/2013
CN 104778923 A 7/2015
(Continued)

OTHER PUBLICATIONS

International Search Report dated Sep. 4, 2018, issued in counterpart application No. PCT/CN2018/089967. (10 pages).
(Continued)

*Primary Examiner* — Tom V Sheng
(74) *Attorney, Agent, or Firm* — WHDA, LLP

(57) ABSTRACT

The present disclosure is related to a pixel circuit. The pixel circuit may include a first transistor, a photoelectric sensor, a switch transistor, a second transistor, a third transistor, and a light-emitting component. The first transistor may be configured to transmit a data voltage in response to a scanning signal of an N-th row. The second transistor may be configured to generate a driving current based on a data voltage transmitted by the first transistor and to generate a leakage current based on an electric signal transmitted by the
(Continued)

switching transistor. The third transistor may be configured to compensate a threshold voltage of the second transistor in response to a scanning signal of an N-th row. The light-emitting component may be configured to emit light under an action of a driving current generated by the second transistor.

18 Claims, 3 Drawing Sheets

(52) U.S. Cl.
CPC ............... *G09G 2300/0819* (2013.01); *G09G 2300/0842* (2013.01); *G09G 2320/0295* (2013.01); *G09G 2360/14* (2013.01)

(58) Field of Classification Search
CPC .......... G09G 2360/14; G09G 2360/148; G06F 3/042; G06F 3/0421
USPC ........................................................ 345/204
See application file for complete search history.

(56) References Cited

U.S. PATENT DOCUMENTS

| | | | | |
|---|---|---|---|---|
| 2007/0103406 | A1* | 5/2007 | Kim | G09G 3/3233 345/76 |
| 2009/0121984 | A1* | 5/2009 | Yamamoto | G09G 3/3266 345/76 |
| 2015/0193045 | A1* | 7/2015 | Zhou | G06F 3/041 345/174 |
| 2016/0163243 | A1 | 6/2016 | Park et al. | |
| 2016/0372048 | A1* | 12/2016 | Wang | G09G 3/2003 |
| 2017/0186782 | A1* | 6/2017 | Lee | H01L 27/1225 |
| 2017/0270853 | A1* | 9/2017 | Xiang | G09G 3/3275 |
| 2019/0279566 | A1* | 9/2019 | Wang | G09G 3/3241 |

FOREIGN PATENT DOCUMENTS

| | | |
|---|---|---|
| CN | 204680360 U | 9/2015 |
| CN | 105931599 A | 9/2016 |
| CN | 106097976 A | 11/2016 |
| CN | 106409224 A | 2/2017 |
| CN | 106875894 A | 6/2017 |
| CN | 106991976 A | 7/2017 |
| CN | 107342049 A | 11/2017 |
| CN | 107908310 A | 4/2018 |

OTHER PUBLICATIONS

Office Action dated Jun. 5, 2019, issued in counterpart CN application No. 201711116593.8, with English translation. (23 pages).

* cited by examiner

PIXEL CIRCUIT, DRIVING METHOD THEREOF, AND DISPLAY APPARATUS

CROSS-REFERENCE TO RELATED APPLICATIONS

This application claims benefit of the filing date of Chinese Patent Application No. 201711116593.8 filed on Nov. 13, 2017, the disclosure of which is hereby incorporated in its entirety by reference.

TECHNICAL FIELD

This invention relates to a display technology, and more particularly, to a pixel circuit, a driving method thereof, and a display apparatus.

BACKGROUND

Comparing with a Thin Film Transistor Liquid Crystal Display (TFT-LCD), which is a conventional mainstream display technology, an Organic Light Emitting Diode (OLED) display has advantages such as wide viewing angle, high brightness, high contrast ratio, low energy consumption, light weight, and thin thickness. The Organic Light Emitting Diode (OLED) display has become a focus of current flat panel display technologies.

A driving method of an OLED display is divided into two types, which are Passive Matrix (PM) type and Active Matrix (AM) type. Compared with the driving method of the passive matrix type, the driving method of active matrix type has advantages such as large amount of display information, low power consumption, long service life, high image contrast ratio, and the like. FIG. 1 shows an equivalent circuit of a driving circuit of a pixel unit of an active matrix type of OLED display in the prior art. The circuit includes a first switching transistor M1, a driving transistor M2, a storage capacitor C1, and a light-emitting apparatus D1.

BRIEF SUMMARY

Accordingly, one example of the present disclosure is a pixel circuit. The pixel circuit may include a first transistor, a photoelectric sensor, a switch transistor, a second transistor, a third transistor, and a light-emitting component. The second transistor may be configured to generate a driving current based on a data voltage transmitted by the first transistor and to generate a leakage current based on an electric signal transmitted by the switching transistor. The third transistor may be configured to compensate a threshold voltage of the second transistor in response to a scanning signal of a Nth row. The light-emitting component may be configured to emit light under an action of the driving current generated by the second transistor. N is an integer greater than 1.

A first electrode of the first transistor may be electrically connected with a data line, a second electrode of the first transistor may be electrically connected with a first electrode of the second transistor, and a control electrode of the first transistor may be electrically connected with the scanning signal line of the N-th row. A first electrode of the second transistor may be electrically connected a the second electrode of the first transistor, a second electrode of the second transistor may be electrically connected with a first electrode of the light-emitting apparatus, and a control electrode of the second transistor may be electrically connected with the first electrode of the third transistor and the second terminal of the storage capacitor respectively. A first electrode of the third transistor may be electrically connected with a control electrode of the second transistor and a second terminal of the storage capacitor respectively, a second electrode of the third transistor may be electrically connected with a first electrode of the light emitting component, and a control electrode of the third transistor may be electrically connected with the scanning signal line of the N-th row.

A first electrode of the light-emitting component may be electrically connected with a second electrode of the second transistor and a second electrode of the third transistor respectively, and a second electrode of the light-emitting component may be electrically connected with a low power supply terminal. A first electrode of the switch transistor may be electrically connected with a second terminal of the photoelectric sensor, a second electrode of the switch transistor may be electrically connected with a second terminal of the storage capacitor, a control electrode of the second transistor, and a first electrode of the third transistor respectively, and a control electrode of the switch transistor may be electrically connected with a photosensitive control line.

The pixel circuit may further include a read transistor, which is configured to read the leakage current generated by the second transistor in response to the photosensitive control signal and a storage capacitor, which is configured to store the data voltage transmitted to the second transistor.

The pixel circuit may further include a fourth transistor, which is configured to discharge the data voltage stored in the storage capacitor through an initialization voltage in response to the scanning signal of the (N−1)-th row and a fifth transistor, which is configured to discharge the leakage current generated by the second transistor through the initialization voltage in response to the scanning signal of the (N−1)-th row.

A first electrode of the fourth transistor may be electrically connected with an initialization voltage terminal, a second electrode of the fourth transistor may be electrically connected with a control electrode of the second transistor, a first electrode of the third transistor, and a second terminal of the storage capacitor respectively, and a control electrode of the fourth transistor may be electrically connected with the scanning signal line of the (N−1)-th row. A first electrode of the fifth transistor may be electrically connected with the initialization voltage terminal, a second electrode of the fifth transistor may be electrically connected with a first electrode of a light-emitting component, and a control electrode of the fifth transistor may be electrically connected with the scanning signal line of the (N−1)-th row.

The pixel circuit may further include a sixth transistor, which is configured to provide a power supply voltage to the second transistor in response to a light-emitting control signal and a seventh transistor, which is configured to output the driving current generated by the second transistor to the light-emitting component in response to the light-emitting control signal. A first electrode of the sixth transistor may be electrically connected with a voltage terminal of the power supply, a second electrode of the sixth transistor may be electrically connected with the second electrode of the first transistor and the first electrode of the second transistor respectively, and a control electrode of the sixth transistor may be electrically connected a light-emitting control line. A first electrode of the seventh transistor may be electrically connected with the second electrode of the second transistor and the second electrode of the third transistor respectively, a second electrode of the seventh transistor may be electrically connected with the first electrode of the light-emitting component and the second electrode of the fifth transistor respectively, and a control electrode of the seventh transistor may be electrically connected with the light-emitting control line. A first terminal of the storage capacitor may be electrically connected with a voltage terminal of the power supply, and a second terminal of the storage capacitor may be electrically connected with a control electrode of the second transistor and a first electrode of the third transistor respectively. A first electrode of the read transistor may be electrically connected with a reading signal line, a second electrode of the read transistor may be electrically connected with a first terminal of the light-emitting component, and a control electrode of the read transistor may be electrically connected with the photosensitive control line.

Another example of the present disclosure is a pixel circuit. The pixel circuit may include a first transistor, a second transistor, a third transistor, a fourth transistor, a fifth transistor, a sixth transistor, a seventh transistor, a switch transistor, a read transistor, a photoelectric sensor, a storage capacitor, and a light-emitting component. A first electrode of the first transistor may be electrically connected with a data line, a second electrode of the first transistor may be electrically connected with a source electrode of the second transistor, and a control electrode of the first transistor may be electrically connected with a scanning signal line of the N-th row. A first electrode of the second transistor may be electrically connected with the first electrode of the first transistor, a second electrode of the second transistor may be electrically connected with a first electrode of a light-emitting component, and a control electrode of the second transistor may be electrically connected with a source electrode of the third transistor and a second terminal of the storage capacitor respectively. A first electrode of the third transistor may be electrically connected with the control electrode of the second transistor and the second terminal of the storage capacitor respectively, a second electrode of the third transistor may be electrically connected with the first electrode of the light-emitting component, and a control electrode of the third transistor may be electrically connected with the scanning signal line of the N-th row. A first electrode of the fourth transistor may be electrically connected with an initialized voltage terminal, a second electrode of the fourth transistor may be electrically connected with the control electrode of the second transistor, the first electrode of the third transistor, and a second terminal of the storage capacitor respectively, and a control electrode of the fourth transistor may be electrically connected with the scanning signal line of the (N−1)-th row. A first electrode of the fifth transistor may be electrically connected with the initialization signal terminal, a second electrode of the fifth transistor may be electrically connected with the first electrode of the light-emitting component, and a control electrode of the fifth transistor may be electrically connected with the scanning signal line of the (N−1)-th-row. A first electrode of the sixth transistor may be electrically connected with a voltage terminal of a power supply, a second electrode of the sixth transistor may be electrically connected with the second electrode of the first transistor and the first electrode of the second transistor respectively, and a control electrode of the sixth transistor may be electrically connected with a light-emitting control line. A first electrode of the seventh transistor may be electrically connected with the second electrode of the second transistor and the second electrode of the third transistor respectively, the second electrode of the seventh transistor may be electrically connected with the first electrode of the light-emitting component and the second electrode of the fifth transistor respectively, and a control electrode of the seventh transistor may be electrically connected with the light-emitting control line. A first electrode of the switch transistor may be electrically connected with a second terminal of the photoelectric sensor, a second electrode of the switch transistor may be electrically connected with the second terminal of the storage capacitor, the control electrode of the second transistor, and the first electrode of the third transistor respectively, and a control electrode of the switch transistor may be connected with the photosensitive control line. A first electrode of the read transistor may be electrically connected with a read signal line, a second electrode of the read transistor may be electrically connected with the first terminal of the light-emitting component, and a control electrode of the read transistor may be electrically connected with the photosensitive control line. A first terminal of the storage capacitor may be electrically connected with the power supply voltage terminal, and the second terminal of the storage capacitor may be electrically connected with the control electrode of the second transistor and the first electrode of the third transistor respectively. The first electrode of the light-emitting component may be electrically connected with the second electrode of the second transistor and the second electrode of the third transistor respectively, and the second electrode of the light-emitting component may be electrically connected with the low power supply terminal.

Another example of the present disclosure is a driving method of the pixel circuit. The driving method of the pixel circuit may include providing a signal to the scanning line of the (N−1)-th row in an initialization stage, providing a signal to the scanning line of the N-th row in a data writing and threshold compensation stage, and driving the light-emitting component to emit light through the second transistor and providing a light-sensitive control signal to a light-emitting control line in a light emitting and touch control stage.

In the data writing and threshold compensation stage, the first transistor may transmit the data voltage to the second transistor, and the third transistor may compensate the threshold voltage to the second transistor. In the light emitting and touch control stage, the photoelectric sensor may generate an electric signal in response to an optical signal sensed by the photoelectric sensor and transmit the electric signal to the second transistor, the second transistor may generate a corresponding leakage current based on the electric signal; and the read transistor may output the electric signal to determine fingerprint information. Driving the light-emitting component to emit light through the second transistor may include driving the light-emitting component to emit light through the second transistor for a frame of display time.

In the initialization stage, the data voltage in the storage capacitor may be discharged through the initialization voltage; and the leakage current generated by the second transistor may be discharged through the initialization voltage.

Another example of the present disclosure is a display apparatus. The display apparatus may include a pixel circuit according to one embodiment of the present disclosure.

BRIEF DESCRIPTION OF THE DRAWINGS

The subject matter which is regarded as the disclosure is particularly pointed out and distinctly claimed in the claims at the conclusion of the specification. The foregoing and other objects, features, and advantages of the disclosure are apparent from the following detailed description taken in conjunction with the accompanying drawings in which:

DETAILED DESCRIPTION

Figure 1:
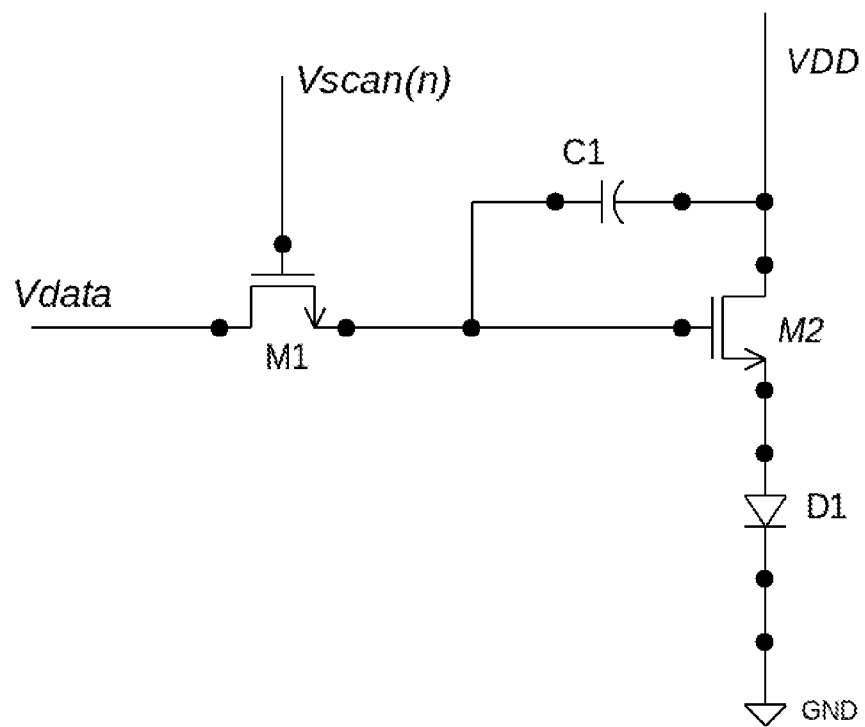
FIG. 1 is a diagram of a pixel circuit in the prior art.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-3. When referring to the figures, like structures and elements shown throughout are indicated with like reference numerals. The described embodiments are part of the embodiments of the present disclosure, and are not all embodiments. According to the embodiments of the present disclosure, all other embodiments obtained by persons of ordinary skill in the art without creative efforts, belong to the protection scope of the disclosure.

The driving circuit of the pixel unit of the prior art has many problems as follows: the threshold voltage $V_{th}$ of the driving transistor M2 at different positions of the display panel is different because of the non-uniformity of the manufacturing process. As a result, with the same data driving signal $V_{data}$, the current (that is, the brightness) of the light-emitting component D1 is different, thereby impacting uniformity of the image and light-emitting quality of the whole OLED display.

In addition, display apparatuses with a fingerprint identification function become more and more popular. However, adding a pixel circuit for a fingerprint recognition function module in a display apparatus is relatively complicated. As a result, the display apparatus cannot achieve high-resolution display.

Therefore, providing a pixel circuit capable of performing threshold compensation of a driving transistor and having a simple structure for a fingerprint recognition function presents a technical challenge that needs to be solved.

The transistors used in embodiments of the present disclosure can be thin film transistors or field effect transistors or similar components of other characteristics. Since the source electrode and the drain electrode of a transistor are interchangeable under certain conditions, there is no difference between the source electrode and the drain electrode in describing connection relationship in the embodiments of the present disclosure. In order to distinguish the source electrode and the drain electrode of the transistor in the embodiments of the present disclosure, one of the two electrodes is called a first electrode and the other is called a second electrode. The gate electrode is called a control electrode. In addition, the transistors can be divided into N-type and P-type according to characteristics of the transistors. In the following embodiments, P-type transistors are used for illustration. When a P-type transistor is adopted, the first electrode of the P-type transistor is the source electrode and the second electrode of the P-type transistor is the drain electrode. When the gate electrode is inputted with a low level, the source electrode is electrically connected with the drain electrode. The N-type transistor is the opposite. Using the transistors of N-type can be realized by those skilled in the art without any creative effort, so it is under the protection scope of the embodiment of the disclosure.

Figure 2:
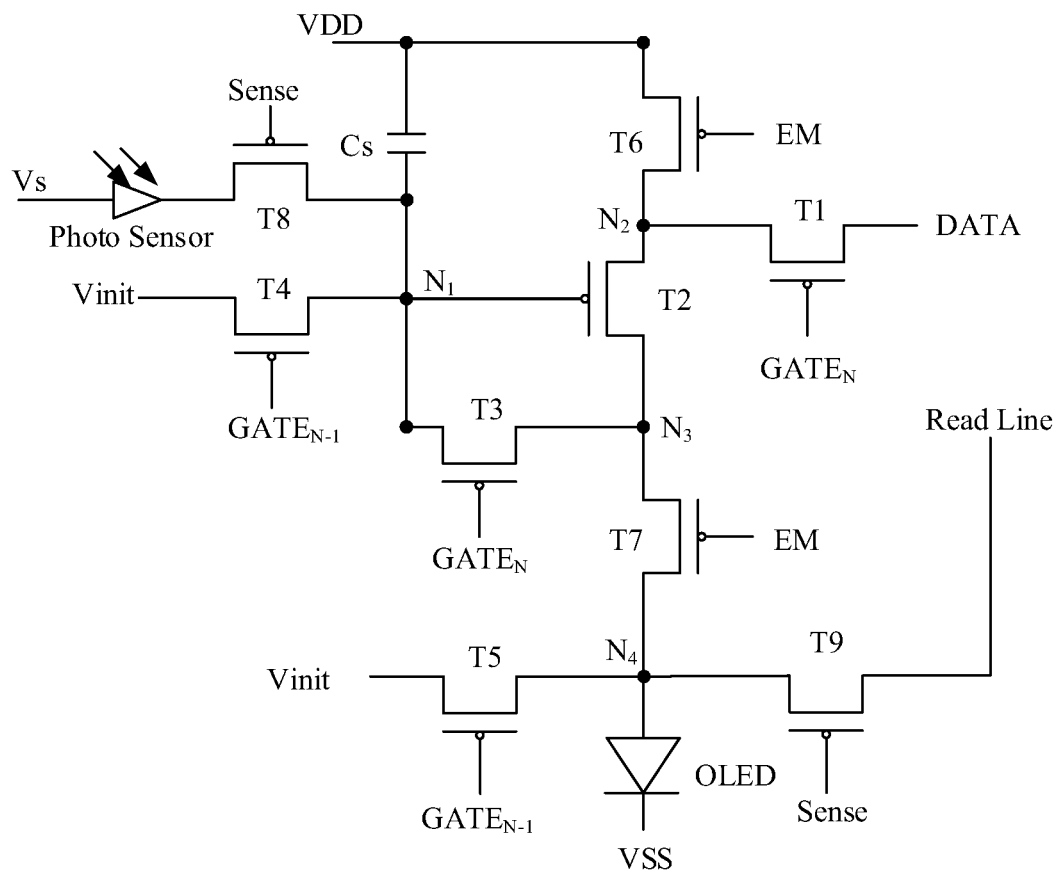
FIG. 2 is a diagram of a pixel circuit according to an embodiment of the present disclosure.

A pixel circuit is provided according to one embodiment of the present disclosure. As shown in FIG. 2, the pixel circuit includes a first transistor T1, a second transistor T2, a third transistor T3, a switch transistor T8, a read transistor T9, a photoelectric sensor, a storage capacitor Cs, and a light-emitting component OLED. The first transistor T1 is used for transmitting a data voltage in response to a scanning signal of the N-th row. The photoelectric sensor is used for generating a corresponding electric signal based on a light signal sensed by the photoelectric sensor. The switch transistor T8 is used for transmitting the electric signal in response to a photosensitive control signal. The second transistor T2 is used for generating a driving current based on the data voltage transmitted by the first transistor T1. Furthermore, the second transistor T2 is also used for generating a leakage current based on the electric signal transmitted by the switching transistor T8. The third transistor T3 is used for compensating the threshold voltage of the second transistor T2 in response to a scanning signal of the (N−1)-th row. The read transistor T9 is used for reading the leakage current generated by the second transistor T2 in response to a photosensitive control signal. The storage capacitor Cs is used for storing the data voltage transmitted to the second transistor T2. The light-emitting component OLED is used for emitting light under action of the driving current generated by the second transistor T2.

According to the pixel circuit provided by the embodiment, the threshold voltage of the second transistor T2 is compensated by the third transistor T3, thereby improving the display effect of the display panel. Moreover, the second transistor 12 can not only generate a driving current in the display stage based on the data voltage transmitted by the first transistor T1 to drive the light-emitting component to emit light, but also generate different leakage currents based on the electric signals outputted by the photoelectric sensor and transmitted by the switch transistor TB in the touch control stage, thereby realizing identification of touch control information.

In one embodiment, the first transistor T1 adopts a P-type transistor. The scanning signal of the N-th row applied to the scanning signal line of the N-th row GATE$_N$ is applied to a gate electrode of the first transistor T1. The data voltage on the related data line is applied to a source electrode of the first transistor T1. A drain electrode of the first transistor T1 is electrically connected with a source electrode of the second transistor T2 (that is, the N2 node as shown in FIG. 2).

In one embodiment, the second transistor T2 adopts a P-type transistor. A gate electrode of the second transistor T2 is electrically connected with a second terminal of the storage capacitor Cs (that is, the N1 node shown in FIG. 2). A drain of the second transistor 12 is electrically connected with a drain of the third transistor T3 (that is, the N3 node shown in FIG. 2) and a first electrode of the light-emitting component OLED respectively. A second electrode of the light-emitting component OLED is electrically connected with a low-voltage terminal VSS.

In one embodiment, the third transistor T3 adopts a P-type transistor. A source electrode and the drain electrode of the third transistor T3 are electrically connected with the gate electrode and the drain electrode of the second transistor T2 respectively. A gate electrode of the third transistor T3 is electrically connected with the scanning signal line of the Nth row GATE$_N$.

In one embodiment, a first terminal of the storage capacitor Cs is electrically connected with a corresponding power supply voltage terminal VDD for receiving a power supply voltage provided by the power supply voltage terminal VDD.

In one embodiment, the switch transistor T8 adopts a P-type transistor. A source electrode of the switch transistor T8 is electrically connected with a second terminal of the photoelectric sensor. A drain electrode of the switch transistor T8 is electrically connected with the second terminal of the storage capacitor Cs, the gate electrode of the second transistor T2, and the source electrode of the third transistor T3 respectively. A gate electrode of the switch transistor T8 is electrically connected with a photosensitive control line (Sense). A first terminal of the photoelectric sensor (Photo Sensor) is electrically connected with a preset voltage terminal $V_S$ In one embodiment, the read transistor T9 adopts a P-type transistor. A source electrode of the read transistor T9 is electrically connected with a read signal line (Read Line). A drain electrode thereof is electrically connected with the first terminal of the light emitting component OLED. A gate electrode thereof is electrically connected with the photosensitive control line Sense.

In some embodiments, the pixel circuit further includes a sixth transistor T6 and a seventh transistor T1. The sixth transistor T6 is used for providing a power supply voltage to the second transistor T2 in response to the light-emitting control signal. The seventh transistor T7 is used for outputting the driving current generated by the second transistor T2 to the light-emitting component OLED in response to the light-emitting control signal.

In some embodiments, the sixth transistor T6 adopts a P-type transistor. A source electrode of the sixth transistor T6 is electrically connected with a power supply voltage terminal VDD. A drain electrode thereof is electrically connected with the drain electrode of the first transistor T1 and the source electrode of the second transistor T2 respectively. A gate electrode thereof is electrically connected with a light-emitting control line EM.

In some embodiments, a source electrode of the seventh transistor T7 is electrically connected with the drain electrode of the second transistor T2 and the drain electrode of the third transistor T3 respectively. The second electrode thereof is electrically connected with the source electrode of the light-emitting component OLED and the drain electrode of a fifth transistor T5 respectively. The gate electrode thereof is electrically connected with the light-emitting control line EM.

In some embodiments, the pixel circuit further includes a fourth transistor T4 and a fifth transistor T5. The fourth transistor T4 is used for discharging the data voltage stored in the storage capacitor Cs through the initialization voltage $V_{init}$ in response to the scanning signal of the (n−1)-th row. The fifth transistor T5 is used for discharging the leakage current generated by the second transistor T2 through the initialization voltage $V_{init}$ win response to the scanning signal of the (n−1)-th row.

In some embodiments, a source electrode of the fourth transistor T4 is electrically connected with the initialization voltage terminal $V_{init}$. A drain electrode thereof is electrically connected with the gate electrode of the second transistor T2, the source electrode of the third transistor T3, and the second terminal of the storage capacitor Cs respectively. A control electrode thereof is electrically connected with the scanning signal line of the (N−1)-th row $GATE_{N-1}$.

In some embodiments, a source electrode of the fifth transistor T5 is electrically connected with the initialization signal terminal $V_{init}$. A drain electrode thereof is electrically connected with the first electrode of the light-emitting component OLED. A gate electrode thereof is electrically connected with the scanning signal line of the (N−1)-th row $GATE_{N-1}$.

Figure 3:
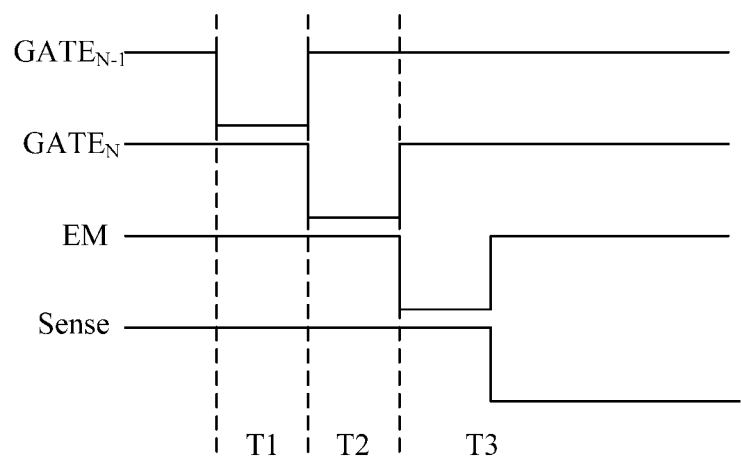
FIG. 3 is a timing diagram of a pixel circuit according to one embodiment of the present disclosure.

FIG. 3 is a timing diagram of the pixel circuit of FIG. 2 according to one embodiment of the present disclosure. A driving method of the pixel circuit in one embodiment of the present disclosure is described as following with reference to FIGS. 2 and 3.

The pixel circuit includes a first transistor T1, a second transistor T2, a third transistor T3 and a fourth transistor T4, a fifth transistor T5 and a sixth transistor T6, a seventh transistor T7, a switch transistor T8 and a read transistor T9, a photoelectric sensor Photo Sensor, a storage capacitor Cs and a light-emitting component. The source electrode of the first transistor T1 is electrically connected with the data line DATA. The drain electrode of the first transistor T1 is electrically connected with the source electrode of the second transistor T2. The gate electrode of the first transistor T1 is electrically connected with the scanning signal line of the N-th row $GATE_N$. The source electrode of the second transistor T2 is electrically connected with the drain electrode of the first transistor T1. The drain electrode thereof is electrically connected with the first electrode of the light-emitting component. The gate electrode thereof is electrically connected with the source electrode of the third transistor T3 and the second terminal of the storage capacitor Cs respectively. The source electrode of the third transistor T3 is electrically connected with the gate electrode of the second transistor T2 and the second terminal of the storage capacitor Cs respectively. The drain electrode thereof is electrically connected with the first electrode of the light-emitting component OLED. The control electrode thereof is electrically connected with the scanning signal line of the (N−1)-th row $GATE_{N-1}$. The source electrode of the fourth transistor T4 is electrically connected with the initialized voltage terminal $V_{init}$. The drain electrode of the fourth transistor T4 is electrically connected with the gate electrode of the second transistor T2, the source electrode of the third transistor T3, and the second terminal of the storage capacitor Cs respectively. The gate electrode of the fourth transistor T4 is electrically connected with the scanning signal line of the (n−1)-th row $GATE_{N-1}$. The source electrode of the fifth transistor T5 is electrically connected with the initialization signal terminal $V_{init}$. The drain electrode thereof is electrically connected with the first electrode of the light-emitting component OLED. The gate electrode thereof is electrically connected with the scanning signal line of the (N−1)-th-row $GATE_{N-1}$. The source electrode of the sixth transistor T6 is electrically connected with the voltage terminal of the power supply VDD. The drain electrode thereof is electrically connected with the drain electrode of the first transistor T1 and the source electrode of the second transistor T2 respectively. The gate electrode thereof is electrically connected with the light-emitting control line EM.

In some embodiments, the source electrode of the seventh transistor T7 is electrically connected with the drain electrode of the second transistor 12 and the drain electrode of the third transistor T3 respectively. The drain electrode thereof is electrically connected with the source electrode of the light-emitting component OLED and the drain electrode of the fifth transistor T5 respectively. The gate electrode thereof is electrically connected with the light-emitting control line EM. The source electrode of the switch transistor T8 is electrically connected with the second terminal of the photoelectric sensor Photo Sensor. The drain electrode thereof is electrically connected with the second terminal of the storage capacitor Cs, the gate electrode of the second transistor T2, and the source electrode of the third transistor T3 respectively. The gate electrode thereof is electrically connected with the photosensitive control line Sense. The source electrode of the read transistor T9 is electrically connected with the read signal line Read Line. The drain electrode of the read transistor T9 is electrically connected with the first terminal of the light-emitting component OLED. The gate electrode thereof is electrically connected with the photosensitive control line Sense. The first terminal of the storage capacitor Cs is electrically connected with the power supply voltage terminal VDD. The second terminal thereof is electrically connected with the gate electrode of the second transistor T2 and the source electrode of the third transistor T3 respectively.

In some embodiments, the source electrode of the light-emitting component OLED is electrically connected with the drain electrode of the second transistor 12 and the drain electrode of the third transistor T3 respectively. The drain electrode thereof is electrically connected with the low power supply terminal VSS.

In some embodiments, the driving method of the pixel circuit specifically includes the following steps:

In the T1 stage (initialization stage), a low-level signal is inputted to a scanning line of the (N−1)-th row $GATE_{N-1}$. The fourth transistor T4 and the fifth transistor T5 are turned on. At this moment, the initialization signal inputted at the initialization voltage terminal $V_{init}$ discharge the potentials of the nodes N1 and N4, which are changed into an initialization voltage so as to initialize the data voltage stored in the storage capacitor Cs.

In the T2 stage (data writing and threshold compensation stage), a low-level signal is inputted to the scanning line of the N-th-row $GATE_N$. The first transistor T1, the second transistor T2 and the third transistor T3 are turned on. At this moment, and the data voltage signal is written to the data line DATA. At this moment, the first transistor T1, the second transistor T2, and the third transistor T3 are turned on. The data voltage signal is written into the N2 node. Since the second transistor T2 and the third transistor T3 are simultaneously turned on, the potentials of the N1 node and the N3 node are equal and equal to $V_{data}+V_{th}$.

In the T3 stage (light emitting and touch control stage), first, a low-voltage signal is inputted to the light-emitting control line EM. The sixth transistor T6 is turned on, and the light-emitting component is driven to emit light through the second transistor T2. At this time, the current flowed into the light-emitting component OLED $Ids=k_n(V_{data}-VDD)^2$, thereby effectively avoiding the influence of the threshold voltage of the driving transistor on the light-emitting component OLED. Then, after a frame of picture is displayed, a low level signal is inputted to the photosensitive control line Sense so that the switch transistor T8 and the read transistor T9 are turned on. At this time, the photoelectric sensor, Photo Sensor, converts an optical signal sensed by the photoelectric sensor into an electric signal, and transmitted the electrical signal to the second transistor T2 through the switch transistor T8. The second transistor T2 generates a corresponding leakage current according to the electric signal, reflecting the amount of light received by the photoelectric sensor Photo Sensor. Then, the read signal line Read Line reads and determines the touch control information.

A display apparatus is provided according to one embodiment of the present disclosure. The display apparatus includes the pixel circuit according to one embodiment of the present disclosure, which is not described in detail herein.

The display apparatus may include an OLED panel, a mobile phone, a tablet, a television, a display, a notebook computer, a digital photo frame, a navigator or other products or parts with display functions.

Since the display apparatus includes the pixel circuit as mentioned above, the image uniformity of the display apparatus of the embodiment is obviously improved.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A pixel circuit comprising:
    a first transistor;
    a photoelectric sensor;
    a switch transistor;
    a second transistor;
    a third transistor;
    a storage capacitor; and
    a light-emitting component,
    wherein the second transistor is configured to generate a driving current based on a data voltage transmitted by the first transistor and to generate a leakage current based on an electric signal transmitted from the photoelectric sensor to a control electrode of the second transistor through the switching transistor, the third transistor is configured to compensate a threshold voltage of the second transistor in response to a scanning signal of a N-th row and the light-emitting component is configured to emit light under an action of the driving current generated by the second transistor, and N is an integer greater than 1;
    the photoelectric sensor is configured to generate the electric signal in response to an optical signal sensed by the photoelectric sensor and transmit the electric signal to the control electrode of the second transistor; and
    a first electrode of the switch transistor is electrically connected with a second terminal of the photoelectric sensor, a second electrode of the switch transistor is electrically connected with a second terminal of the storage capacitor, the control electrode of the second transistor, and a first electrode of the third transistor respectively, and a control electrode of the switch transistor is electrically connected with a photosensitive control line.

2. The pixel circuit according to claim 1, wherein a first electrode of the first transistor is electrically connected with a data line, a second electrode of the first transistor is electrically connected with a first electrode of the second transistor, and a control electrode of the first transistor is electrically connected with the scanning signal line of the N-th row.

3. The pixel circuit according to claim 1, wherein a first electrode of the second transistor is electrically connected to a second electrode of the first transistor, a second electrode of the second transistor is electrically, connected with a first electrode of the light-emitting apparatus, and the control electrode of the second transistor is electrically connected with the first electrode of the third transistor and the second terminal of the storage capacitor respectively.

4. The pixel circuit according to claim 1, wherein the first electrode of the third transistor is electrically connected with the control electrode of the second transistor and the second terminal of the storage capacitor respectively, a second electrode of the third transistor is electrically connected with a first electrode of the light emitting component, and a control electrode of the third transistor is electrically connected with the scanning signal line of the N-th row.

5. The pixel circuit according to claim 1, wherein a first electrode of the light-emitting component is electrically connected with a second electrode of the second transistor and a second electrode of the third transistor respectively, and a second electrode of the light-emitting component is electrically connected with a low power supply terminal.

6. The pixel circuit according to claim 1, further comprising:
a read transistor, which is configured to read the leakage current generated by the second transistor in response to the photosensitive control signal; and
the storage capacitor, which is configured to store the data voltage transmitted to the second transistor.

7. The pixel circuit according to claim 6, further comprising:
a fourth transistor, which is configured to discharge the data voltage stored in the storage capacitor through an initialization voltage in response to the scanning signal of the (N−1)-th row; and
a fifth transistor, which is configured to discharge the leakage current generated by the second transistor through the initialization voltage in response to the scanning signal of the (N−1)-th row.

8. The pixel circuit according to claim 7; wherein a first electrode of the fourth transistor is electrically connected with an initialization voltage terminal, a second electrode of the fourth transistor is electrically connected with the control electrode of the second transistor, the first electrode of the third transistor, and the second terminal of the storage capacitor respectively, and a control electrode of the fourth transistor is electrically connected with the scanning signal line of the (N−1)-th row; and
a first electrode of the fifth transistor is electrically connected with the initialization voltage terminal, a second electrode of the fifth transistor is electrically connected with a first electrode of a light-emitting component, and a control electrode of the fifth transistor is electrically connected with the scanning signal line of the (N−1)-th row.

9. The pixel circuit according to claim 8, further comprising:
a sixth transistor, which is configured to provide a power supply voltage to the second transistor in response to a light-emitting control signal; and
a seventh transistor, which is configured to output the driving current generated by the second transistor to the light-emitting component in response to the light-emitting control signal.

10. The pixel circuit according to claim 9, wherein, a first electrode of the sixth transistor is electrically connected with a voltage terminal of the power supply, a second electrode of the sixth transistor is electrically connected with the second electrode of the first transistor and the first electrode of the second transistor respectively, and a control electrode of the sixth transistor is electrically connected a light-emitting control line; and
a first electrode of the seventh transistor is electrically connected with the second electrode of the second transistor and the second electrode of the third transistor respectively, a second electrode of the seventh transistor is electrically connected with the first electrode of the light-emitting component and the second electrode of the fifth transistor respectively, and a control electrode of the seventh transistor is electrically, connected with the light-emitting control line.

11. The pixel circuit according to claim 6, wherein a first terminal of the storage capacitor is electrically connected with a voltage terminal of the power supply, and the second terminal of the storage capacitor is electrically connected with a control electrode of the second transistor and a first electrode of the third transistor respectively.

12. The pixel circuit according to claim 6, wherein a first electrode of the read transistor is electrically connected with a reading signal line, a second electrode of the read transistor is electrically connected with a first terminal of the light-emitting component, and a control electrode of the read transistor is electrically connected with the photosensitive control line.

13. A driving method of the pixel circuit according to claim 1, comprising:
providing a signal to the scanning line of the (N−1)-th row in an initialization stage;
providing a signal to the scanning line of the N-th row in a data writing and threshold compensation stage; and
driving the light-emitting component to emit light through the second transistor and providing a light-sensitive control signal to a light-emitting control line in a light emitting and touch control stage.

14. The driving method of the pixel circuit according to claim 13, wherein, in the data writing and threshold compensation stage, the first transistor transmits the data voltage to the second transistor, and the third transistor compensates the threshold voltage to the second transistor; and
In the light emitting and touch control stage, the photoelectric sensor generates an electric signal in response to an optical signal sensed by the photoelectric sensor and transmits the electric signal to the second transistor, the second transistor generates a corresponding leakage current based on the electric signal; and the read transistor outputs the electric signal to determine fingerprint information.

15. The driving method of the pixel circuit according to claim 13, wherein driving the light-emitting component to emit light through the second transistor comprises:
driving the light-emitting component to emit light through the second transistor for a frame of display time.

16. The driving method of the pixel circuit according to claim 13, wherein in the initialization stage, the data voltage in the storage capacitor is discharged through the initialization voltage; and the leakage current generated by the second transistor is discharged through the initialization voltage.

17. A display apparatus comprising the pixel circuit of claim 1.

18. A pixel circuit comprising a first transistor, a second transistor, a third transistor, a fourth transistor, a fifth transistor, a sixth transistor, a seventh transistor, a switch transistor, a read transistor, a photoelectric sensor, a storage capacitor, and a light-emitting component, wherein a first electrode of the first transistor is electrically connected with a data line, a second electrode of the first transistor is electrically connected with a source electrode of the second transistor, and a control electrode of the first transistor is electrically connected with a scanning signal line of the N-th row;

a first electrode of the second transistor is electrically connected with the second electrode of the first transistor, a second electrode of the second transistor is electrically connected with a first electrode of a light-emitting component, and a control electrode of the second transistor is electrically connected with a source electrode of the third transistor and a second terminal of the storage capacitor respectively;

a first electrode of the third transistor is electrically connected with the control electrode of the second transistor and the second terminal of the storage capacitor respectively, a second electrode of the third transistor is electrically connected with the first electrode of the light-emitting component, and a control electrode of the third transistor is electrically connected with the scanning signal line of the N-th row;

a first electrode of the fourth transistor is electrically connected with an initialized voltage terminal, a second electrode of the fourth transistor is electrically connected with the control electrode of the second transistor, the first electrode of the third transistor, and a second terminal of the storage capacitor respectively, and a control electrode of the fourth transistor is electrically connected with the scanning signal line of the (N−1)-th row;

a first electrode of the fifth transistor is electrically connected with the initialization signal terminal, a second electrode of the fifth transistor is electrically connected with the first electrode of the light-emitting component, and a control electrode of the fifth transistor is electrically connected with the scanning signal line of the (N−1)-th-row;

a first electrode of the sixth transistor is electrically connected with a voltage terminal of a power supply, a second electrode of the sixth transistor is electrically, connected with the second electrode of the first transistor and the first electrode of the second transistor respectively, and a control electrode of the sixth transistor is electrically connected with a light-emitting control line;

a first electrode of the seventh transistor is electrically connected with the second electrode of the second transistor and the second electrode of the third transistor respectively, the second electrode of the seventh transistor is electrically connected with the first electrode of the light-emitting component and the second electrode of the fifth transistor respectively, and a control electrode of the seventh transistor is electrically connected with the light-emitting control line;

a first electrode of the switch transistor is electrically connected with a second terminal of the photoelectric sensor, a second electrode of the switch transistor is electrically connected with the second terminal of the storage capacitor, the control electrode of the second transistor, and the first electrode of the third transistor respectively, and a control electrode of the switch transistor is connected with the photosensitive control line;

a first electrode of the read transistor is electrically connected with a read signal line, a second electrode of the read transistor is electrically connected with the first terminal of the light-emitting component, and a control electrode of the read transistor is electrically connected with the photosensitive control line;

a first terminal of the storage capacitor is electrically connected with the power supply voltage terminal, and the second terminal of the storage capacitor is electrically connected with the control electrode of the second transistor and the first electrode of the third transistor respectively; and the first electrode of the light-emitting component is electrically connected with the second electrode of the second transistor and the second electrode of the third transistor respectively, and the second electrode of the light-emitting component is electrically connected with the low power supply terminal.

* * * * *